United States Patent
Kvaale et al.

(10) Patent No.: US 11,045,748 B2
(45) Date of Patent: Jun. 29, 2021

(54) METHOD FOR FILLING A CONTAINER WITH A FOAMABLE COMPOSITION

(71) Applicant: GE HEALTHCARE AS, Oslo (NO)

(72) Inventors: Svein Kvaale, Oslo (NO); Carl Peter Tonseth, Oslo (NO); Ole Johannes Tokerud, Oslo (NO)

(73) Assignee: GE Healthcare AS, Oslo (NO)

( * ) Notice: Subject to any disclaimer, the term of this patent is extended or adjusted under 35 U.S.C. 154(b) by 639 days.

(21) Appl. No.: 14/397,230

(22) PCT Filed: Apr. 26, 2013

(86) PCT No.: PCT/EP2013/058757
§ 371 (c)(1),
(2) Date: Oct. 27, 2014

(87) PCT Pub. No.: WO2013/164269
PCT Pub. Date: Nov. 7, 2013

(65) Prior Publication Data
US 2015/0068157 A1    Mar. 12, 2015

(30) Foreign Application Priority Data

Apr. 30, 2012 (EP) ................................. 12166106

(51) Int. Cl.
| | |
|---|---|
| *B65B 31/02* | (2006.01) |
| *B01D 19/02* | (2006.01) |
| *B65B 31/00* | (2006.01) |
| *B65B 3/00* | (2006.01) |
| *B65B 7/28* | (2006.01) |
| *B65B 31/04* | (2006.01) |

(52) U.S. Cl.
CPC .............. *B01D 19/02* (2013.01); *B65B 3/003* (2013.01); *B65B 7/28* (2013.01); *B65B 31/00* (2013.01); *B65B 31/042* (2013.01)

(58) Field of Classification Search
CPC .......... B65B 31/00; B67C 3/20; A61K 49/223
USPC ................... 53/79, 403, 432, 510
See application file for complete search history.

(56) References Cited

U.S. PATENT DOCUMENTS

| | | | | | |
|---|---|---|---|---|---|
| 3,212,537 | A | * | 10/1965 | Aloys ................. | B67C 3/10 141/6 |
| 3,526,186 | A | * | 9/1970 | Cornelius .............. | B29C 51/14 220/62 |
| 3,804,133 | A | * | 4/1974 | Copping ................. | B67C 3/10 141/37 |
| 4,655,029 | A | * | 4/1987 | Weiss ................. | B67C 3/10 141/6 |
| 4,987,726 | A | | 1/1991 | Petho et al. | |
| 5,178,841 | A | * | 1/1993 | Vokins ................. | B65B 55/10 422/28 |
| 5,299,408 | A | * | 4/1994 | Dupont ................. | B67B 1/04 53/109 |
| 5,305,757 | A | * | 4/1994 | Unger ................. | A61K 9/127 424/9.51 |
| 5,320,144 | A | | 6/1994 | Ahlers | |
| 5,409,688 | A | | 4/1995 | Quay | |
| 5,417,255 | A | * | 5/1995 | Sanfilippo .............. | B65B 31/00 141/1 |
| 5,458,165 | A | * | 10/1995 | Liebmann, Jr. ......... | B65B 31/04 141/19 |
| 5,552,133 | A | | 9/1996 | Lambert et al. | |
| 5,617,705 | A | * | 4/1997 | Sanfilippo .............. | B65B 31/00 53/281 |
| 5,634,500 | A | * | 6/1997 | Clusserath ............. | B67C 3/10 141/44 |
| 5,656,211 | A | * | 8/1997 | Unger ................. | A61K 9/127 264/4.1 |
| 5,682,723 | A | * | 11/1997 | Nowotarski ........... | B65B 31/00 53/110 |
| 5,773,024 | A | * | 6/1998 | Unger ................. | A61K 8/046 424/450 |
| 5,884,677 | A | * | 3/1999 | McKaughan ............ | B67C 3/10 141/145 |
| 6,220,301 | B1 | | 4/2001 | Guthler | |
| 6,220,310 | B1 | * | 4/2001 | Emmer ................ | B67C 3/10 141/11 |
| 6,221,337 | B1 | * | 4/2001 | Dugstad ................ | A61K 49/22 424/9.52 |

(Continued)

FOREIGN PATENT DOCUMENTS

| | | |
|---|---|---|
| CN | 1054399 A | 9/1991 |
| CN | 1119008 A | 3/1996 |

(Continued)

OTHER PUBLICATIONS

Office Action issued in corresponding CN Application 201380022644.4, filed Apr. 26, 2013 (dated Oct. 10, 2015).
PCT/EP2013/058757 ISRWO dated Aug. 20, 2013.
Korea Notice of Preliminary Rejection corresponding to Korean Application No. 10-2014-7030074, dated Nov. 12, 2019 (with English Translation).
China First Office Action and Search Report corresponding to Chinese Application No. 201810521647.7, dated Sep. 16, 2019. X.
Mexico Office Action corresponding to Mexican Application No. MX/E/2015/032236, dated May 23, 2019 (translation included).

(Continued)

*Primary Examiner* — Andrew M Tecco
*Assistant Examiner* — Eyamindae C Jallow
(74) *Attorney, Agent, or Firm* — Jeff B. Vockrodt; Culhane Meadow, PLLC

(57) ABSTRACT

The present invention relates to a process for preparation of a composition comprising gas microbubbles. More particularly the invention relates to a process for filling of such composition into a container. The composition prepared is preferably an ultrasound contrast media composition made available in a container wherein the headspace of the container comprises the same gas as the gas of the microbubbles.

20 Claims, No Drawings

(56) References Cited

U.S. PATENT DOCUMENTS

| | | | |
|---|---|---|---|
| 6,280,705 B1 * | 8/2001 | Trevino | A61K 49/227 424/9.51 |
| 6,457,495 B1 * | 10/2002 | Meheen | B67C 3/10 141/40 |
| 6,723,303 B1 | 4/2004 | Quay | |
| 8,257,338 B2 * | 9/2012 | Keenan | A61M 5/007 604/500 |
| 2001/0002993 A1 * | 6/2001 | Ostensen | A61K 49/223 424/9.52 |
| 2002/0151792 A1 * | 10/2002 | Conston | A61B 8/481 600/439 |
| 2003/0175211 A1 * | 9/2003 | Schneider | A61K 49/223 424/9.52 |
| 2004/0180004 A1 * | 9/2004 | Schneider | A61K 49/225 424/9.51 |
| 2005/0136002 A1 * | 6/2005 | Fossheim | A61B 5/01 424/1.11 |
| 2005/0260189 A1 * | 11/2005 | Klibanov | A61K 9/127 424/130.1 |
| 2006/0034770 A1 * | 2/2006 | Schneider | A61K 49/223 424/9.52 |
| 2006/0237094 A1 | 10/2006 | Roebuck | |
| 2007/0128117 A1 * | 6/2007 | Bettinger | A61K 49/223 424/9.52 |
| 2008/0045919 A1 * | 2/2008 | Jakob | A61M 5/162 604/406 |
| 2008/0063603 A1 * | 3/2008 | Schneider | A61K 49/223 424/9.52 |
| 2009/0071106 A1 * | 3/2009 | Sjoholm | B65B 55/18 53/432 |
| 2009/0159485 A1 * | 6/2009 | Jakob | A61M 5/162 206/571 |
| 2010/0287887 A1 * | 11/2010 | Bolan | A61K 49/0002 53/452 |
| 2011/0300191 A1 * | 12/2011 | Barkai | A61K 35/39 424/400 |
| 2012/0201900 A1 * | 8/2012 | Borden | A61K 49/223 424/600 |
| 2013/0156706 A1 * | 6/2013 | Bettinger | A61K 49/222 424/9.52 |

FOREIGN PATENT DOCUMENTS

| | | | |
|---|---|---|---|
| CN | 2818447 Y | 9/2006 | |
| CN | 101588968 A | 11/2009 | |
| CN | 101641257 A | 2/2010 | |
| EP | 0633030 A1 | 1/1995 | |
| EP | 0973552 B1 * | 3/2006 | ........... A61K 47/554 |
| EP | 2844362 A1 | 3/2015 | |
| GB | 953826 | 4/1964 | |
| JP | S61115879 A | 6/1986 | |
| JP | 649196 A | 1/1989 | |
| JP | S649196 A | 1/1989 | |
| JP | 1279018 A | 9/1989 | |
| JP | 8509002 A | 9/1996 | |
| JP | H08509002 A | 9/1996 | |
| KR | 101076053 B1 | 10/2011 | |
| RU | 2234305 C1 | 8/2004 | |
| RU | 2344833 C2 | 1/2009 | |
| WO | 1994/28797 A1 | 12/1994 | |
| WO | 1995/01187 | 1/1995 | |
| WO | 96/08234 | 3/1996 | |
| WO | 1996/18420 A1 | 6/1996 | |
| WO | 1997/29783 A1 | 8/1997 | |
| WO | 1997/40858 A1 | 11/1997 | |
| WO | 1998105364 A2 | 2/1998 | |
| WO | 1998/10798 A1 | 3/1998 | |
| WO | 1999/05061 | 2/1999 | |
| WO | 1999/08716 A2 | 2/1999 | |
| WO | 1999008716 A2 | 2/1999 | |
| WO | 1999/08716 A3 | 8/1999 | |
| WO | 2013/164269 A1 | 11/2013 | |

OTHER PUBLICATIONS

Mexico Office Action corresponding to Mexican Application No. MX/a/2014/013218, dated Sep. 23, 2019.

Office Action Received for European Patent Application No. 13720880.7, dated Jan. 24, 2018, 5 pages.

Office Action Received for Japanese Patent Application No. 2015-509383, dated Feb. 7, 2017, (5 pages Google Translation of Office Action and 4 pages of Official Copy).

Office Action Received for European Patent Application No. 13720880.7, dated Mar. 7, 2017, 5 pages.

Office Action Received for Russian Patent Application No. 2014142309, dated Mar. 9 2017, 11 pages (5 pages English Translation and 6 pages official Copy).

Schneider et al. "BR1: A New Ultrasonographic Contrast Agent Based on Sulfur Hexafluoride-Filled Microbubbles", Investigative Radiology, vol. 30, No. 8, Aug. 1995, pp. 451-457.

* cited by examiner

METHOD FOR FILLING A CONTAINER WITH A FOAMABLE COMPOSITION

This application is a filing under 35 U.S.C. 371 of international application number PCT/EP2013/058757, filed Apr. 26, 2013, which claims priority to EPO application number 12166106.0 filed Apr. 30, 2012, the entire disclosure of each of which is hereby incorporated by reference.

The present invention relates to a process for preparation of a composition comprising gas microbubbles. More particularly the invention relates to a process for filling of such composition into a container. The composition prepared is preferably an ultrasound contrast media composition made available in a container wherein the headspace of the container comprises the same gas as the gas of the microbubbles, and wherein the gas is different from air.

It is well known that ultrasonic imaging comprises a valuable diagnostic tool, for example in studies of the vascular system, particularly in cardiography, and of tissue microvasculature. A variety of ultrasound contrast media has been proposed to enhance the acoustic images so obtained, including suspensions of solid particles, emulsified liquid droplets, gas bubbles and encapsulated gases or liquids. The most successful ultrasound contrast media have generally consisted of dispersions of small bubbles of gas that can be injected intravenously. If appropriately stabilized microbubbles may permit highly effective ultrasound visualization of, for example, the vascular system and tissue microvasculature, often at advantageously low doses. Such contrast media typically include a material stabilizing the gas dispersion, for example emulsifiers, oils, thickeners or sugars, or by entraining or encapsulating the gas in a variety of systems, e.g. as porous gas-containing microparticles or as encapsulated gas microbubbles. The microbubbles include a gas with properties that are essential for the performance of the ultrasound contrast agent, and a variety of gases have been found to enhance properties such as the microbubble stability and duration of echogenic effect. One group of ultrasound contrast media is prepared and delivered in a container as a ready-made preparation comprising a liquid composition of gas microbubbles.

In such liquid composition comprising gas microbubbles, the microbubbles may typically comprise another gas than air, herein named dispersed gas, such as a fluorinated gas. To compensate, or avoid, that the dispersed gas is leaking out of the microbubbles during storage, the headspace of the container is filled with a headspace gas usually being the same gas as used in the microbubbles. If this is not done, a certain amount of the gas in the microbubbles will comprise a substantial amount of air rather than the desired dispersed gas as time goes, as the microbubbles leak. For approved liquid ultrasound contrast media there is typically a specification provided for how many percentage of the headspace gas needs to be the microbubble gas. Hence, when manufacturing the contrast media the filling process typically includes a step of delivering a purge gas, being the headspace gas, into the container after the contrast media has been filled in, to expel the air in the headspace, before the capping. The applicant has however faced a problem during such preparation of a contrast media. It has been found difficult to ensure that absolute all of the containers filled with contrast media contain the required amount of the headspace gas in the headspace. When it is found that the specification is not met, the container, and normally the whole batch, has to be discarded. In an existing manufacturing method, the prepared contrast media composition, comprising a suspension of microbubbles, was pumped from a bulk container and dispensed into vials. The vials were then purged of air by flowing the headspace gas, which is heavier than air, into and around the vial, before a stopper and a cap was placed in the mouth of the vial. However, a problem the applicant has been faced with was that when filling the contrast media into the container, foam and large gas bubbles containing air were occasionally generated, probably as a result of the venturi effect, and such large air bubbles remained during the delivery of the headspace gas into the container. As a result, the required amount of headspace gas in the headspace was not always achieved. Several unsuccessful methods to remove these large air bubbles have been tried, such as methods for replacing the air in such bubbles with the dispersed gas. There is hence still a need in the art, for providing a process for preparation of a container filled with a composition comprising gas microbubbles in a liquid carrier, wherein the requirement to the amount of headspace gas in the headspace is fulfilled.

In view of the needs of the art the present invention provides a process including filling a composition comprising gas microbubbles into a container, ensuring that the specification regarding the amount of headspace gas in the headspace of the container is met for every container being filled. The applicant has surprisingly found that rather than displacing the air from the headspace of the filled containers with a headspace gas after the contrast media is filled into the container, the headspace gas is beneficially delivered into the empty container first, hence displacing the air from the whole container with the headspace gas, followed by filling the composition into the container.

In a first aspect the invention hence provides a process for preparing a container filled with a composition comprising gas microbubbles in a liquid carrier, the process comprising the sequential steps of a) purging the air from the container with a headspace gas, and then;

b) filling the composition into the container.

By using such filling process, including a pre purge flushing of the empty containers with a headspace gas, air bubbles are not generated, and it has been found that all containers being filled with the composition fulfil the specification requirement regarding gas in the headspace.

The process further comprises the optional step of closing the containers after step b), such as by either inserting a stopper into the mouth of the filled container, and/or attach a cap and/or attach an over seal being crimped over the stopper and/or cap.

The container used in the process of the invention is a vial, a bottle or a bag. The container may be formed of glass or plastic, such as clear or opaque plastic, and may be either a rigid or flexible plastic container. The size of the container is e.g. from 3 ml to 50 000 ml and is preferably a vial or bottle of 3-500 ml. Most preferably the container includes one, or at least one dose.

The composition is, when filled into the container a ready-made preparation, i.e. the composition is preferably a dispersion of gas microbubbles in a physiologically acceptable aqueous carrier, such as in water for injection. The composition is ready for being injected into a patient, being a human being or animal, but may need gentle shaking before injection to provide a homogeneous suspension. The composition may be for therapeutic or diagnostic purposes, or combined, and is preferably for diagnostic use as an ultrasound contrast media. Contrast media which comprise gas microbubbles are preferred since microbubble dispersions, if appropriately stabilized, are particularly efficient backscatterers of ultrasound by virtue of the low density and ease of compressibility of the microbubbles. Ultrasound contrast media wherein the microbubble comprises a vector having affinity for a biological target are also enclosed.

The gas microbubbles used in the process of the invention are stabilized by a stabilizing agent which can enclose the gas microbubbles, retarding the diffusion of the gas into the surrounding liquid and additionally preventing the fusion between microbubbles. Various compositions are encompassed such as those including the use of gelatins or albumin microbubbles that are initially formed in liquid suspension, and which entrap gas during solidification. Alternatively, thick shells, e.g. sugars, or other viscous materials, or solid particles or liquid emulsion droplets can be prepared. Another type of stabilizing agents entraps gas bubbles in liposomes made by phospholipid layer such as in U.S. Pat. No. 5,334,381.

Such stabilizing agents may be a surfactant or a more solid shell material, and is e.g. selected from the group of polymers, such as polysaccharides, lipids, and protein-based material. Most preferably, the stabilizing material comprises phospholipids or protein-based materials, more preferably a heat-denaturable biocompatible protein and most preferably human serum albumin.

Biocompatible gases may be employed in the microbubbles of the compositions, and in the first step of the invention. The headspace gas used in the first step of the invention is preferably the same gas as the dispersed gas of the microbubbles, it being appreciated that the terms "gas", "dispersed gas" and "headspace gas" include any substances (including mixtures) substantially or completely in gaseous (including vapour) form at the normal human body temperature of 37° C. The gas may thus, for example, comprise nitrogen, oxygen, carbon dioxide, hydrogen, nitrous oxide, an inert gas such as helium, argon, xenon or krypton;
a sulphur fluoride such as sulphur hexafluoride, disulphur decafluoride or trifluoromethylsulphur pentafluoride;
selenium hexafluoride;
an optionally halogenated silane such as tetramethylsilane;
a low molecular weight hydrocarbon (e.g. containing up to 7 carbon atoms), for example an alkane such as methane, ethane, a propane, a butane or a pentane, a cycloalkane such as cyclobutane or cyclopentane, an alkene such as propene or a butene, or an alkyne such as acetylene;
an ether; a ketone; an ester;
a halogenated low molecular weight hydrocarbon e.g. containing up to 7 carbon atoms; or a mixture of any of the foregoing.

Compositions comprising a halogenated low molecular weight hydrocarbon are preferred. At least some of the halogen atoms in halogenated gases are advantageously fluorine atoms. Thus biocompatible halogenated hydrocarbon gases may, for example, be selected from bromochlorodifluoromethane, chlorodifluoromethane, dichlorodifluoromethane, bromotrifluoromethane, chlorotrifluoromethane, chloropentafluoroethane, dichlorotetrafluoroethane and perfluorocarbons, e.g. perfluoroalkanes such as perfluoromethane, perfluoroethane, perfluoropropanes, perfluorobutanes (e.g. perfluoro-n-butane, optionally in admixture with other isomers such as perfluoroisobutane), perfluoropentanes, perfluorohexanes and perfluoroheptanes; perfluoroalkenes such as perfluoropropene, perfluorobutenes (e.g. perfluorobut-2-ene) and perfluorobutadiene; perfluoroalkynes such as perfluorobut-2-yne; and perfluorocycloalkanes such as perfluorocyclobutane, perfluoromethylcyclobutane, perfluorodimethylcyclobutanes, perfluorotrimethylcyclobutanes, perfluorocyclopentane, perfluoromethylcyclopentane, perfluorodimethylcyclopentanes, perfluorocyclohexane, perfluoromethylcyclohexane and perfluorocycloheptane.

Other halogenated gases include fluorinated, e.g. perfluorinated, ketones such as perfluoroacetone and fluorinated, e.g. perfluorinated, ethers such as perfluorodiethyl ether. It may further be advantageous using the process of the invention for compositions comprising fluorinated gases such as sulphur fluorides or fluorocarbons (e.g. perfluorocarbons) which are known to form particularly stable microbubble suspensions, wherein $SF_6$, perfluoropropane and perfluorobutane are preferred, and perfluoropropane is particularly preferred.

Most preferably, the process of the invention is for preparation of a composition comprising microbubbles comprising proteins, most preferably comprising albumin, encapsulating a perfluorocarbon gas, most preferably perfluorpropane, also called octafluoropropane (OFP) or perflutren.

The process of the invention wherein the headspace gas is heavier than air is preferred. The headspace gas is preferably the same gas as the dispersed gas, hence if or when the dispersed gas is leaking out of the microbubbles during storage, the headspace gas of the container will compensate for this. If the headspace gas is different from the dispersed gas, a certain amount of the microbubbles will comprise the headspace gas rather than the desired dispersed gas as time goes. In some embodiments of the invention, the headspace gas is alternatively different from the dispersed gas. E.g. the gas in the headspace may comprise a gas with a lower boiling point than the dispersed gas. This is to avoid that the headspace gas condenses when being cooled, such as if the container is put in the fridge. In this embodiment, the two gases should be similar, such as e.g. two different perfluorinated hydrocarbon gases having different boiling point. In another embodiment, the dispersed gas is air and the headspace gas is another gas, preferably a heavier gas, such as a fluorinated gas. During storage a certain amount of the microbubbles will then beneficially comprise the headspace gas rather than the original air.

The process of the invention is particularly useful for preparation of aqueous compositions of microbubbles, wherein the microbubbles comprise a gas different from air. Examples of specific such ultrasound contrast media that may be prepared according to the invention are, for purposes of illustration and not of limitation, BR14, MP1950, Optison™ and PESDA, wherein Optison™ is particularly preferred.

The composition used in the process of the invention can be prepared by different processes to create the dispersion of gas microbubbles, such as by sonication, spray drying or mixing by applying mechanical energy such as by use of a colloid mill (rotor stator). In one embodiment of the invention, the process includes, prior to step a), process steps wherein the composition is prepared by a process wherein a solution of the stabilizing material, preferably the human serum albumin in an aqueous solution, and the gas to be dispersed, are fed into a colloid mill where they are thoroughly mixed. When a homogenous dispersion of gas microbubbles has been prepared, this is transferred into a bulk container. The bulk container is e.g. a flexible big bag, e.g. of a volume of 10-100 L. In step b) of the process of the invention, the composition is dispensed from the bulk container into the containers in which air has been displaced with a headspace gas in step a).

For different gas-containing contrast media there may be different requirements to the amount, i.e. percentage, of gas needed in the headspace of the container, depending e.g. on which gas is included in the microbubble, the stabilizing material used and how easily the gas diffuses out of the bubbles. With the process of the invention the specification regarding the amount of dispersed gas in the headspace of the container is met for every container being filled. The gas content in the headspace of the filled containers is typically measured by gas chromatography, e.g. by measuring the concentration of the gas in a statistical number of the containers produced. In one embodiment of the invention a gas content of 40-100% of the headspace volume, such as at least 50%, or preferably at least 60%, such as at least 70% is achieved by the process of the invention. For preparation of the ultrasound contrast media Optison™, being a preferred embodiment, the specification requirement of at least 60% perfluoropropane gas in the headspace is fulfilled when using the process of the invention. In a container filled according to the process of the invention, typically about 20-50% of the total container volume is headspace. Preferably about 40% of the total container volume, when being filled with a composition, is headspace. For instance in a 5 ml vial there will be about 3 ml of the composition and about 2 ml headspace. And as given above, 40-100% of this headspace comprises the headspace gas, when the container has been filled with the composition.

In the process of the invention, a purging needle connected to a tank containing the headspace gas is positioned into the container and the empty container is pre-purged with the headspace gas. The needle is preferably positioned towards the bottom of the container when purging the air. When withdrawing the needle from the container the purging preferably continues to prevent that air is entering the container when the purging needle is removed. The empty containers are e.g. purged with the headspace gas at a speed of 200-800 cc/minute, such as at 400-600 cc/minute, and preferably at about 500 cc/minute. The gas flow rate needed also depends of the vial size to be used. As the headspace gas is preferably heavier than air the gas will stay inside the container during the filling with the composition. During the filling with the composition there is no foam or large bubbles generated, and the headspace gas will neatly lay on top of the composition when the filling is ended. Should a bubble be generated during filling, it will only contain the purge gas used and will not reduce the headspace gas content. The step of filling the composition into the container is preferably done subsequently after the step of purging the air from the container, and is e.g. done within 10 seconds, such as e.g. within 5 seconds from ending the purging of the air. Preferably, the containers are then subsequently closed. When using the process of the invention, the filling can be done quickly without any problems with foam generation, and a high number of packages including containers with the compositions can be prepared each day. Using the process of the invention about 2000-3000 containers can be filled per hour, depending on several factors, such as e.g. the size of the containers. If producing 5 ml vials filled with the composition, e.g. about 20-50 000 vials can be filled per day, providing an economically viable process.

When using the process of the invention the requirement to a certain amount of headspace gas in headspace is achieved, without any interruption in the filling due to foam generation and without any containers having to be discarded. There will be equilibrium between the gas in the microbubbles and the gas in the headspace, and the microbubbles will stay stable during storage. After filling and capping, the microbubbles may float, generating a layer at the surface. Re-suspension by gentle shaking may be needed to provide a homogeneous suspension before injection to a patient.

In a second aspect the invention provides containers comprising a composition prepared according to the process of the first aspect. The composition may be for therapeutic or diagnostic purposes, or combined, and is preferably for diagnostic use as an ultrasound contrast media. A variety of imaging techniques may be employed in ultrasound applications, for example including fundamental and harmonic B-mode imaging and fundamental and harmonic Doppler imaging; if desired three-dimensional imaging techniques may be used. The contrast agent may also be used in ultrasound imaging methods based on correlation techniques.

In another aspect, the invention provides an apparatus for use in a process for preparing a container filled with a composition comprising gas microbubbles in a liquid carrier, the apparatus comprising i) a pre purge flushing device; ii) a dispense entity for dispensing the composition into the container. The flushing device preferably comprises at least one purging needle connected to a tank containing the headspace gas for delivering of the headspace gas into the container. The dispense entity e.g. includes a tube connected to a bulk container, wherein a pump is pumping the composition from the bulk container through the tube, dispensing it into the containers. The tube may further be connected to a needle for filling into the container. The apparatus preferably further comprises a tunnel comprising two walls held together by a roof, wherein the roof includes one or more openings, and preferably at least two. The use of the tunnel has been found to reduce the Venturi effect. The purging needle is designed to be inserted into one of the openings of the roof and into the mouth of the container. Prior to step a) of the process of the invention, the empty containers are placed on a conveyer belt that transports these into the tunnel of the apparatus wherein firstly the purging needle is inserted into an opening of the tunnel and into the mouth of the container, positioning the needle towards the bottom of the container and purging the air from the container with a headspace gas. The purging needle is then withdrawn, continuing the purging, and then subsequently and preferably within seconds after the purging has ended, the composition is filled into the containers using the dispense entity of the apparatus. The tube of the dispense entity, or alternatively a filling needle connected to the tube, is positioned in and through another opening of the tunnel, and into the mouth of the container which has been pre-purged of air. When one set of containers have been pre-purged of air, the containers will be filled while a new set of containers are purged. The containers are subsequently stoppered and capped. This aspect includes the same features as the first aspect regarding choice of gas and stabilizing materials.

The invention is now illustrated with reference to the following non-limiting examples.

EXAMPLES

Example 1

Comparison Example—Filling of Optison™ into Containers using Post-Purging of Air A Groninger Filling Machine was used to aseptically dispense, stopper, cap and crimp Optison™ filled vials.

The Optison solution was pumped from a bulk container by means of a peristaltic pump and dispensed into 500 vials of 3 ml. The pump speed was set at 140 rpm and the pump acceleration at 100%. The vials were then purged of air by flowing perfluoropropane gas (OFP) into and under a tunnel at a flow rate of 300 cc/minute. The Groninger Filling Machine then inserted stoppers, caps and crimps on the caps.

During testing of perfluoropropane headspace on a production lot, 90 samples were tested and of these 3 failed the headspace criteria of at least 60% headspace. The three failing samples were taken towards the end of the run. To verify the test results, repeats and additional laboratory testing was performed. These tests involved re-testing the 3 failing headspace samples and several passing samples. Based on the test results, both passing and failing samples were identical to the original test. Using this process the mean content of perfluoropropane headspace obtained was 65%.

During the filling of the Optison composition into the vials large bubbles were observed in the vials. During a step of post purging, the gas inside the large bubble was not replaced with perfluoropropane. During storage the large bubbles popped and the gas of these mixed with the headspace gas. As the gas inside the large bubble is air, the total perfluoropropane gas content in the head space was reduced as a result. The vials including large bubbles were tested for perfluorpropane headspace content after the bubbles had popped. All of the vials which included large air bubbles failed the perfluoropropane headspace specification, and values were as low as 40% perfluoropropane in headspace.

Example 2

Filling of Optison™ into Containers using the Claimed Process with Pre-Purging of Air A Groninger Filling Machine was used to aseptically dispense, stopper, cap and crimp Optison™ filled vials.

Investigational studies, referred to in Example 1, indicated that the use of a post fill purge was not optimizing the perfluoropropane head space content. It was however determined that a pre-fill perfluoropropane purge of the empty vial, prior to filling, at a purge rate of 500 cc/minutes improved the perfluoropropane head space content considerable.

500 vials of 3 ml were purged of air by flowing perfluorpropane gas into and around the empty vials at a flow rate of 500 cc/minute. The Optison solution was then pumped from a bulk container by means of a peristaltic pump and dispensed into the vials. The pump speed was set at 100 rpm and the pump acceleration at 50%. The Groninger Filling Machine then inserted stoppers, caps and crimps on the caps.

Of the 500 vials 90 vials were pulled out for headspace analysis during the process, and inspected for any big bubbles being generated.

To provide for this pre fill purge process the product filling needle was moved down one position to where the post fill perfluoropropane purge needle had previously been located. The purging needle was lowered to the bottom of the vials during purging. This positioning of the pre-fill purge needle and the product fill needle further optimized the perfluoropropane head space.

Using this pre-purge process the mean content of perfluoropropane headspace obtained was 75%. Hence this has been demonstrated to be improved from a mean of 65% to 75% by pre-purging the empty vial with 500 cc/minutes of perfluoropropane gas in lieu of post fill purging the dispensed vial at 300 cc/minutes. All vials fulfilled the headspace criteria of at least 60% headspace. Further, the Perfluoropropane headspace was found to have less variation and the standard deviation was reduced from 7.4 to 1.9.

It was important that the purging needle was lowered to the bottom of the vials during purging to be able to flush out the air. If the needle was only lowered to the top of the neck of the vial the perfluoropropane would mix with the gas in the vial and not flush out the air. Using this process any large bubble generated during filling would contain perfluoropropane instead of air, and would not reduce the perfluoropropane headspace content.

A process capability calculation was performed using 6 Sigma limits on the data from filled vials and it was concluded that the filling process was stable and no vials should fail using the recommended pre-purge parameters.

What is claimed is:

1. A process for preparing a container filled with a liquid ultrasound contrast medium composition comprising gas microbubbles in a liquid carrier, the process comprising the sequential steps of
   (a) purging air from a container by filling the container with a halogenated headspace gas, wherein the halogenated headspace gas is added to the container at a rate of 200 to 800 cc/minute through a needle positioned proximate the bottom of the container at the start of the filling; and
   (b) filling the liquid composition into the container after step (a),
   wherein the filled container comprises a headspace and 40-100% of the headspace volume comprises the headspace gas.

2. The process of claim 1, wherein the headspace gas used in step a) is the same gas as the gas of the micro bubbles.

3. The process of claim 1, wherein the headspace gas is a biocompatible gas being heavier than air.

4. The process of claim 1, wherein the microbubbles comprise a polymeric stabilizing material.

5. The process of claim 4, wherein the polymeric stabilizing material of the micro bubbles is a protein-based material.

6. The process of claim 1, further comprising a step of closing the container.

7. The process of claim 1, wherein the filled container comprises a headspace and at least 60% of the headspace volume comprises the headspace gas.

8. The process of claim 1, wherein the purging continues while the needle is withdrawn from the container.

9. The process of claim 1, wherein the halogenated headspace gas is added to the container at a rate of 400 to 600 cc/minute.

10. The process of claim 1, wherein the halogenated headspace gas is added to the container at a rate of about 500 cc/minute.

11. The process of claim 1, wherein the halogenated headspace gas lays on top of the liquid composition after step (b).

12. The process of claim 11, wherein the container is closed within 5 seconds after purging air from the container.

13. The process of claim 1, wherein the container is closed within 10 seconds after purging air from the container.

14. The process of claim 1, wherein the container is closed within 5 seconds after purging air from the container.

15. The process of claim 1, wherein the halogenated headspace gas is added through a needle positioned proximate the bottom of the container at the start of the filling.

16. The process of claim 1, further comprising closing the container after step b) without a post-fill purge of halogenated headspace gas.

17. The process of claim 1, wherein the halogenated headspace gas is perflutren.

18. A process for preparing a container filled with a liquid ultrasound contrast medium composition comprising gas microbubbles in a liquid carrier, the process comprising the sequential steps of
  (a) purging air from a container by filling the container with a halogenated headspace gas; and
  (b) filling the liquid composition into the container after step (a), followed by closing the container without a post-fill purge of halogenated headspace gas;
  wherein the filled container comprises a headspace and 40-100% of the headspace volume comprises the headspace gas.

19. The process of claim 18, wherein the halogenated headspace gas is perflutren.

20. The process of claim 18, wherein the purging continues while the needle is withdrawn from the container.

\* \* \* \* \*